(12) United States Patent
Kidachi

(10) Patent No.: US 9,345,205 B2
(45) Date of Patent: May 24, 2016

(54) DRIPPER FOR DRIP IRRIGATION AND DRIP IRRIGATION DEVICE

(71) Applicant: Enplas Corporation, Saitama (JP)

(72) Inventor: Masahiro Kidachi, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 14/427,328

(22) PCT Filed: Sep. 27, 2013

(86) PCT No.: PCT/JP2013/005772
§ 371 (c)(1),
(2) Date: Mar. 11, 2015

(87) PCT Pub. No.: WO2014/050140
PCT Pub. Date: Mar. 4, 2014

(65) Prior Publication Data
US 2015/0223414 A1 Aug. 13, 2015

(30) Foreign Application Priority Data

Sep. 28, 2012 (JP) ................. 2012-216575
Sep. 28, 2012 (JP) ................. 2012-216576

(51) Int. Cl.
*A01G 25/02* (2006.01)
(52) U.S. Cl.
CPC .................... *A01G 25/023* (2013.01)
(58) Field of Classification Search
CPC .............. A01G 25/02; A01G 25/023
See application file for complete search history.

(56) References Cited

U.S. PATENT DOCUMENTS

| 4,008,853 | A | | 2/1977 | Tregillus |
| 5,203,503 | A | | 4/1993 | Cohen |
| 5,246,170 | A | * | 9/1993 | Woidt ................ B05B 1/323 239/520 |
| 5,586,727 | A | * | 12/1996 | Shekalim ............ A01G 25/023 239/542 |
| 5,620,143 | A | | 4/1997 | Delmer et al. |

(Continued)

FOREIGN PATENT DOCUMENTS

| FR | 2447755 A1 | 8/1980 |
| JP | 52-079314 A | 7/1977 |

(Continued)

OTHER PUBLICATIONS

International Search Report for PCT/JP2013/005772 mailed Jan. 7, 2014.

(Continued)

*Primary Examiner* — Darren W Gorman
(74) *Attorney, Agent, or Firm* — Brundidge & Stanger, P.C.

(57) ABSTRACT

Dripper comprises Substrate integrally formed of a resin material and that includes a channel for an irrigating liquid. The channel comprises Inflow control part for controlling flowing in of the irrigating liquid and/or Flow rate control part for controlling the flow rate of the irrigating liquid that has flowed in. Inflow control part opens the channel in association with an increase in the pressure of the liquid to flow therein, and Flow rate control part closes the channel in association with an increase in the pressure of the liquid that has flowed in Dripper. Dripper is able to stabilize the control of inflow and discharge of the irrigating liquid, regardless of whether the pressure of the irrigating liquid increases or decreases, and also is able to achieve a reduction in manufacturing costs and improvement in manufacturing efficiency.

12 Claims, 14 Drawing Sheets

(56) References Cited

U.S. PATENT DOCUMENTS

| | | | |
|---|---|---|---|
| 6,015,102 A * | 1/2000 | Daigle | A01G 25/023 239/533.13 |
| 6,027,048 A | 2/2000 | Mehoudar | |
| 6,213,408 B1 | 4/2001 | Shekalim | |
| 2002/0088877 A1 | 7/2002 | Bertolotti et al. | |
| 2013/0248622 A1 * | 9/2013 | Kim | A01G 25/026 239/542 |

FOREIGN PATENT DOCUMENTS

| | | |
|---|---|---|
| JP | 2010-046094 A | 3/2010 |
| WO | 2005/115634 A1 | 12/2005 |
| WO | 2013/175802 A1 | 11/2013 |

OTHER PUBLICATIONS

European Search Report dated Apr. 6, 2016, for corresponding European Application No. 13841162.4.

* cited by examiner

DRIPPER FOR DRIP IRRIGATION AND DRIP IRRIGATION DEVICE

TECHNICAL FIELD

The present invention relates to a dripper for drip irrigation (hereinafter also referred to as an "dripper") and a drip irrigation apparatus including the dripper, and particularly to a dripper and a drip irrigation apparatus including the dripper which are suitable for growing plants.

BACKGROUND ART

Conventionally, drip irrigation systems have been employed to supply water or irrigation liquid such as liquid fertilizer to the plants to be grown on the soil in the agricultural land, plantation and the like.

Such a drip irrigation system comprises for example a channel terminal and an elongated drip watering tube connected to the channel terminal, wherein the channel terminal comprises a filter, a fertigation apparatus (a chemigation apparatus if necessary), a back flow prevention apparatus, a main pipe, and the like connected in sequence on the downstream side of a pump that brings up water from a water source. The drip watering tube is laid on the soil on which plants may be grown.

The drip watering tube has a plurality of ejection ports provided to an elongated tube main body at a predetermined interval between the adjacent ports along the longitudinal direction of the tube main body. The irrigation liquid in the tube main body is ejected at a predetermined ejection amount per unit time (or ejection speed) from the ejection ports. Thus, the irrigation liquid is slowly supplied to the soil outside of the drip watering tube (that is, drip irrigation is performed).

The drip watering tube can save water and fertilizer. Further, the drip watering tube can supply water at a moderate supply speed, and oxygen for plant roots can be ensured in the soil. Accordingly, plants can be favorably managed for growing.

In the above drip watering tube, a plurality of drippers, which correspond to the respective ejection ports, for controlling the amount of the irrigation liquid to be ejected from the respective ejection ports per unit time are provided.

The dripper is configured, for example, such that water flowing in the tube main body flows into the dripper through an inlet of the dripper and flows through a pressure reduction channel, which is called labyrinth, in the dripper to reduce the pressure of the water, and is ejected from the ejection port communicated with the pressure reduction channel on the downstream side thereof.

Further, there are known some conventional drippers provided with a so-called differential pressure control mechanism (pressure correction function). Such conventional drippers have, for example, a three-component structure in which an elastic film (for example, silicone rubber) such as a diaphragm is sandwiched by an inflow side member and an ejection side member, as disclosed in PTL 1.

The dripper disclosed in PTL 1 controls the opening/closing of the entrance port of the dripper and the flow rate of water from the exit port of the dripper, by the movement of the diaphragm (film) in accordance with a water pressure outside of the dripper (in-pipe water pressure).

Specifically, in the dripper disclosed in PTL 1, when the in-pipe water pressure outside of the dripper is increased to a certain level, the diaphragm that is originally so disposed as to shield the entrance is deflected by the in-pipe water pressure toward the outlet. Due to the deformation of the diaphragm, the entrance is opened. When the in-pipe water pressure is further increased, the amount of the deflection of the diaphragm toward the outlet is increased. In association with the deformation of the diaphragm, the sectional size of the channel at the outlet is reduced, and thus the ejection amount of water is regulated.

As disclosed also in paragraph [0004] of PTL 1, the dripper disclosed in PTL 1 is designed such that the ejection speed from the dripper has substantially no relation with the fluctuation in pressure of the supplied liquid for irrigation to the dripper.

Therefore, PTL 1 discloses that the disclosed dripper is favorable for limiting variation in the ejection amount of the irrigation liquid between the drippers disposed on the upstream side (high pressure side) and on the downstream side (low pressure side) in the tube main body, to thereby uniformize the growing of plants over the entire soil.

CITATION LIST

Patent Literature

PTL 1
Japanese Patent Application Laid-Open No. 2010-46094

SUMMARY OF INVENTION

Technical Problem

However, the dripper disclosed in PTL 1 has the following four problems.
(First Problem)
The dripper disclosed in PTL 1 has a configuration of sandwiching the diaphragm (film) between other two members. Therefore, an increase in the size of the dripper (in particular, increase in the size in the height direction) is required. Accordingly, the area occupancy of the dripper in the tube main body with respect to the section of the channel becomes naturally larger.

Thus, in the tube main body, the dripper on the upstream side serves as a large hindrance laid on the channel, and hinders the flow of the irrigation liquid that passes through the dripper on the upstream side to be supplied to the dripper on the downstream side. Therefore, the pressure drop in the tube main body is undesirably increased.

Therefore, the dripper disclosed in PTL 1 may require a high pressure pump for long-distance watering utilizing a considerably long drip watering tube, and the ejection amount may also be unstable.
(Second Problem)
In addition, the dripper disclosed in PTL 1 may have a problem of an error in the operations of the diaphragm that should control the opening/closing of the entrance port (flow rate of the irrigation liquid) when the three components are assembled together with low precision, causing the flow control of the irrigation liquid to be unstable.
(Third Problem)
Further, the dripper disclosed in PTL 1 may have a problem of increased material costs when silicone rubber is used for the diaphragm.
(Fourth Problem)
Furthermore, the dripper disclosed in PTL 1 requires that the above three components should be precisely assembled after the three components are separately manufactured, thus making it difficult to enhance manufacturing efficiency.

The present invention has been achieved taking into consideration the above-mentioned problems. An object of the present invention is to provide a dripper and a drip irrigation apparatus including the dripper which can properly perform a long-distance irrigation even when the liquid pressure of irrigation liquid is low, can stabilize the inflow control of the irrigation liquid, and can achieve cost reduction and enhancement in manufacturing efficiency.

Solution to Problem

To achieve the above-mentioned object, the present invention provides the following dripper and drip irrigation apparatus.

[1] A dripper for controlling an amount of irrigation liquid ejected from an ejection port extending through a pipe wall of a flow pipe through which the irrigation liquid flows, the dripper configured to be disposed at a position corresponding to the ejection port on an inner peripheral surface of the flow pipe, the dripper including: a substrate including a resin material, to be joined to the inner peripheral surface of the flow pipe, and including a channel part for composing a channel in the dripper, wherein the channel part includes an inflow part that introduces the irrigation liquid in the flow pipe into the dripper, and satisfies one or both of the following items (A) and (B):

(A) the inflow part being an inflow control part that controls the inflow of the irrigation liquid based on a set value of a liquid pressure of the irrigation liquid in the flow pipe, the inflow control part having a plate-like body to be exposed to the irrigation liquid in the flow pipe and a first slit formed in the plate-like body, for introducing the irrigation liquid in the flow pipe thereinto, the first slit being formed so as to have an opening width of zero when the plate-like body is not exposed to the irrigation liquid having a liquid pressure equal to or more than the set value, and the plate-like body maintaining the opening width of the first slit at zero without deforming the first slit toward the inner peripheral surface side of the flow pipe so as to inhibit the inflow of the irrigation liquid through the first slit when the liquid pressure is less than the set value, and expanding the first slit such that the opening width of the first slit is more than zero by deforming the first slit toward the inner peripheral surface side of the flow pipe so as to allow the inflow of the irrigation liquid through the first slit when the liquid pressure is equal to or more than the set value; and (B) the channel part further including a flow rate control part formed at a position on a downstream side of the inflow part so as to face the inner peripheral surface of the flow pipe for controlling a flow rate of the irrigation liquid flowing from the inflow part to the ejection port, the flow rate control part having a plate-shaped valve element to be exposed to the introduced irrigation liquid and a second slit being formed in the valve element, for allowing the introduced irrigation liquid to flow toward the ejection port side, the second slit being formed so as to have a predetermined opening width when the valve element does not receive a liquid pressure equal to or more than a predetermined value, and the valve element being deformed toward the inner peripheral surface side from a side of the flow pipe opposite to the inner peripheral surface depending on the liquid pressure to decrease the opening width of the second slit with respect to the predetermined opening width as the liquid pressure is increased.

[2] The dripper according to [1], wherein the first slit is formed radially to divide the plate-like body into a plurality of segments.

[3] The dripper according to [2], wherein the plate-like body is formed so as to be protruded toward the inner peripheral surface side of the flow pipe.

[4] The dripper according to [3], wherein the plate-like body is formed such that a center portion of the plate-like body is protruded the most, and the first slit is formed radially around the center portion.

[5] The dripper according to [4], wherein the plate-like body is formed in a domed shape.

[6] The dripper according to [1], wherein the valve element is formed so as to be protruded toward a side of the flow pipe opposite to the inner peripheral surface, and the second slit is formed radially to divide the valve element into a plurality of valve segments.

[7] The dripper according to [6], wherein the valve element is formed such that a center portion of the valve element is protruded the most, and the second slit is formed radially around the center portion.

[8] The dripper according to [7], wherein the valve element is formed in a domed shape.

[9] The dripper according to any one of [1] to [8], wherein the flow rate control part is disposed at a position offset in a direction orthogonal to a thickness direction of the substrate with respect to the inflow control part.

[10] The dripper according to any one of [1] to [9], wherein the channel part further includes a guide channel part for composing, together with the inner peripheral surface of the flow pipe, a guide channel for guiding the introduced irrigation liquid toward the flow rate control part side, and a hollow part that is formed at a position on a downstream side of the guide channel part and on an upstream side of the flow rate control part and allows communication between the guide channel part and the second slit.

[11] The dripper according to any one of [1] to [10], wherein the channel part further includes a pressure reduction channel part for composing, together with the inner peripheral surface of the flow pipe, a pressure reduction channel that allows the irrigation liquid having passed through the flow rate control part or the inflow control part to flow toward the ejection port while reducing the pressure of the irrigation liquid.

[12] A drip irrigation apparatus including a flow pipe through which irrigation liquid flows, and the dripper according to any one of [1] to [11] for controlling an amount of the irrigation liquid ejected from an ejection port extending through a pipe wall of the flow pipe, the dripper being disposed at a position corresponding to the ejection port on an inner peripheral surface of the flow pipe.

Advantageous Effects of Invention

According to the present invention, even when the liquid pressure of irrigation liquid is low, long-distance watering can be properly performed, and the inflow control of the irrigation liquid can be stabilized. Further, cost reduction and enhancement in manufacturing efficiency can be achieved.

With the invention according to [1], the channel part for composing the channel, of the dripper, including one or both of the inflow control part and the flow rate control part can be integrally formed with the substrate comprising a resin material. Therefore, the dripper can be precisely manufactured at lower cost and at fewer processes and in a smaller size (in particular, reduced thickness (lower height)). As a result, it is possible to achieve cost reduction for the dripper due to reduction in manufacturing cost and enhancement in manufacturing efficiency for the dripper without a high-precision assembly process being required.

In a case where the above inflow part is the inflow control part, even when the liquid pressure (in other words, flow pressure) of the irrigation liquid is low, long-distance watering can be properly performed, and in addition the inflow control and thus the ejection control of the irrigation liquid can be stabilized. When the channel part includes the inflow part and the above flow rate control part, a dripper excellent in the control of the ejecting amount can be provided, thus enabling the ejecting amount of the irrigation liquid to be stabilized. When the channel part includes both the inflow control part and the flow rate control part, the flow rate of the irrigation liquid toward the ejection port can be limited by the flow rate control part, not only in the case of using the dripper under low liquid pressure but also in the case of using the dripper under high liquid pressure, and thus the ejection amount of the irrigation liquid can be properly controlled.

With the invention according to [2], a plurality of segments are deformed toward the inner peripheral surface side of the flow pipe and radially relative to the center of the first slit (outwardly in the radial direction), and in accordance with this deformation the opening width of the first slit is increased. Therefore, it is possible to form the inflow control part in a simple shape suitable to expand the first slit depending on the liquid pressure of the irrigation liquid, thus enabling the inflow control to be further suitable and the costs to be further reduced.

With the invention according to [3], the contact area between each segment and the irrigation liquid is increased, thereby increasing force in a direction to expand the first slit acting on each segment when each segment recieves the liquid pressure. Therefore, even when the liquid pressure of the irrigation liquid is low, each segment can be further surely deformed to allow the first slit to be properly expanded.

With the invention according to [4], a suitable configuration can be selected for aligning the deforming movements of the valve segments by equalizing their size. Therefore, it becomes possible to further simplify the inflow control and further reduce the costs.

With the invention according to [5], the plate-like body can be formed into a further simpler shape. Therefore, it becomes possible to further reduce the costs.

With the invention according to [6], a plurality of valve segments are deformed toward the center of the radial slit while the height of the protrusion toward the side of the flow pipe opposite to the inner peripheral surface is reduced by the liquid pressure, thereby decreasing the opening width of the second slit. Therefore, the flow rate control part can be formed into a simple shape suitable to decrease the opening width of the second slit depending on the liquid pressure of the irrigation liquid, thus enabling the inflow control to be further suitable and the costs to be further reduced.

With the invention according to [7], a suitable configuration can be selected for aligning the deforming movements of the valve segments by equalizing their size. Therefore, it becomes possible to further simplify the inflow control and further reduce the costs.

With the invention according to [8], the valve element can be formed into a further simpler shape. Therefore, it becomes possible to further reduce the costs.

With the invention according to [9], a further reduced thickness can be achieved. Therefore, it becomes possible to allow long-distance watering under low liquid pressure to be further suitable.

With the invention according to [10], even when the flow rate control part is formed at a position offset in a direction orthogonal to the thickness direction from the inflow control part for the purpose of reduced thickness, a part of the channel from the inflow part (inflow control part) to the flow rate control part can be properly formed with a guide channel part and a hollow part formed in the substrate.

With the invention according to [11], it becomes possible to allow the ejection speed to be further suitable by reducing the pressure of the irrigation liquid.

With the invention according to [12], even when the liquid pressure of the irrigation liquid is low, long-distance watering can be properly performed. In addition, the flow control and thus the ejection control (ejection amount) of the irrigation liquid can be stabilized. Further, it is possible to provide a drip irrigation apparatus capable of achieving cost reduction due to the reduction in manufacturing cost and enhancement in manufacturing efficiency without a high-precision assembly process being required.

DESCRIPTION OF EMBODIMENTS

In the following, a dripper according to the present invention and a drip irrigation apparatus including the dripper will be described with reference to FIGS. 1 to 14.

Figure 1:
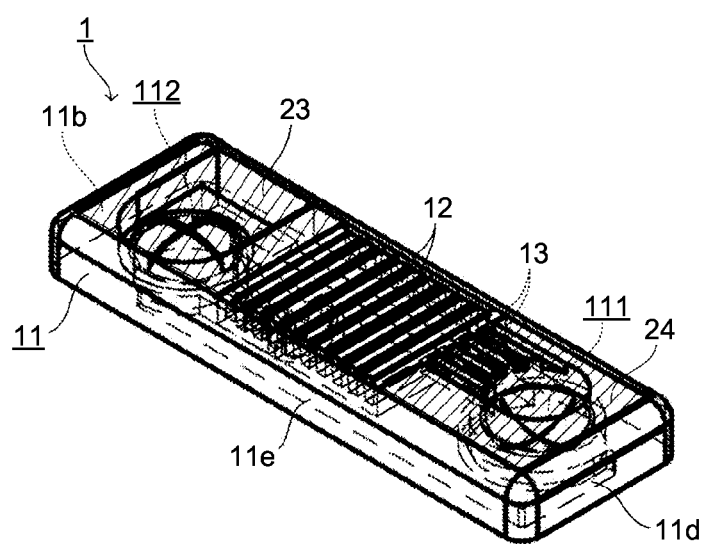
FIG. 1 is a transparent perspective birds-eye view of a dripper according to an embodiment of the present invention.
Figure 2:
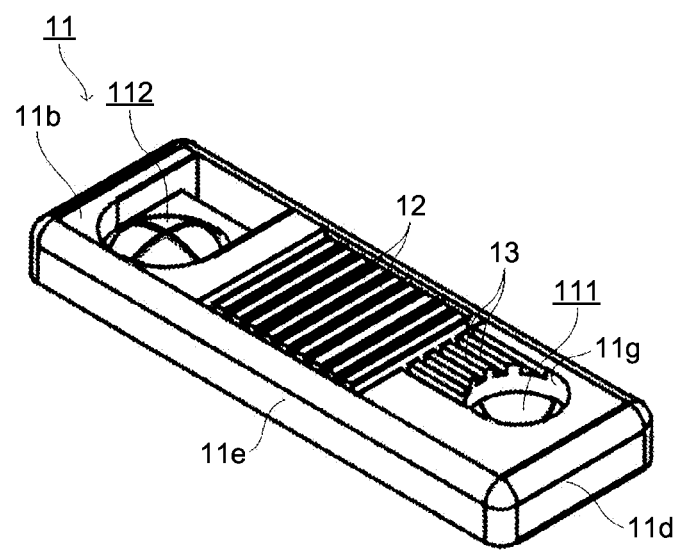
FIG. 2 is a perspective birds-eye view of a substrate for the dripper.
Figure 3:
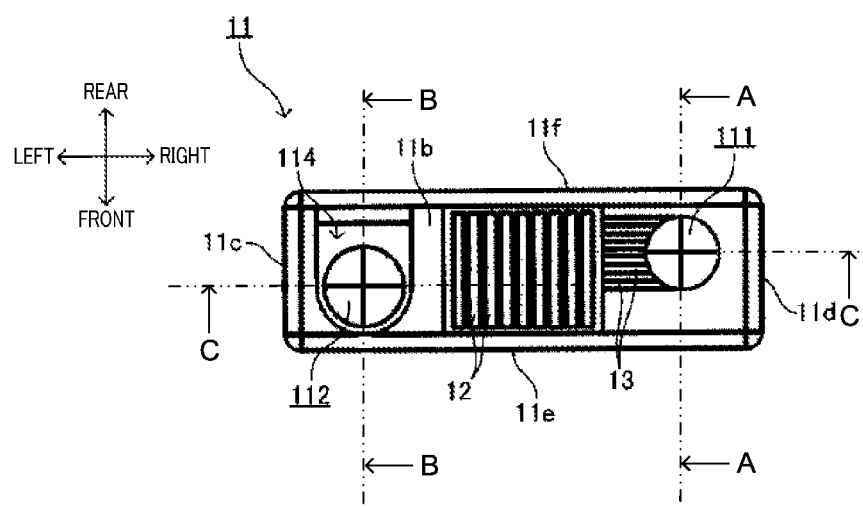
FIG. 3 is a plan view of the substrate.
Figure 4:
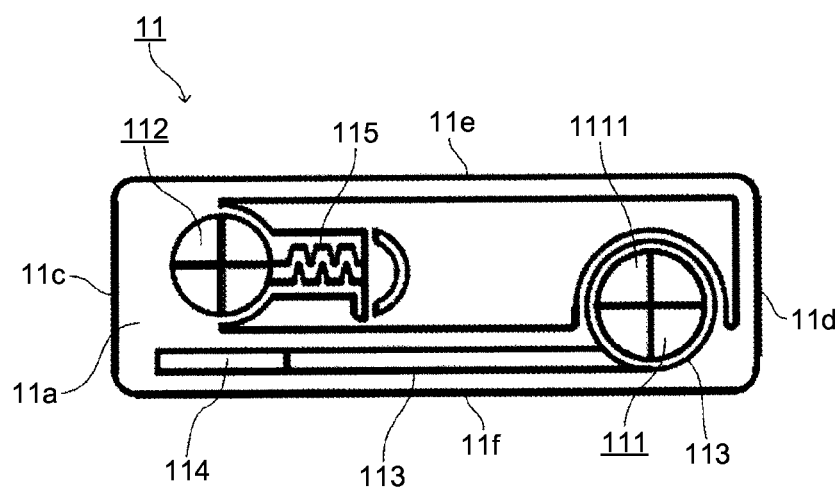
FIG. 4 is a bottom view of the substrate.
Figure 5:
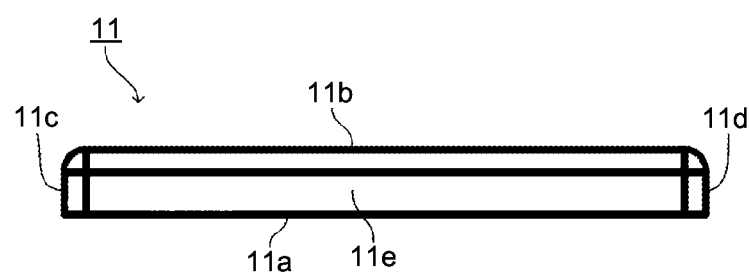
FIG. 5 is a front view of the substrate.
Figure 6:
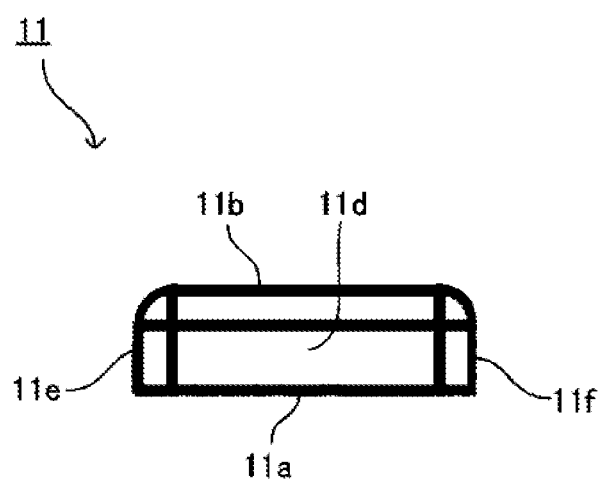
FIG. 6 is a right side view of the substrate.
Figure 7:
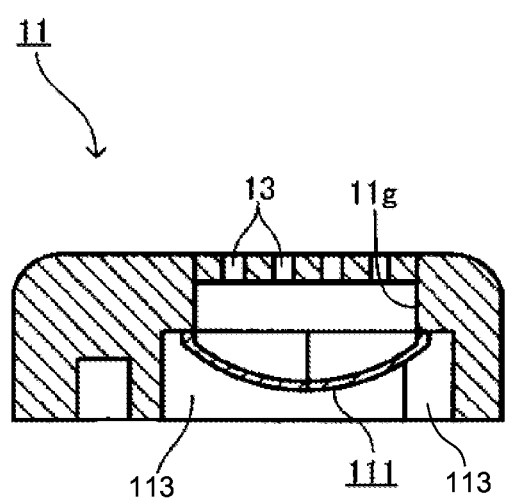
FIG. 7 is a sectional view of the substrate taken along line A-A in FIG. 3.
Figure 8:
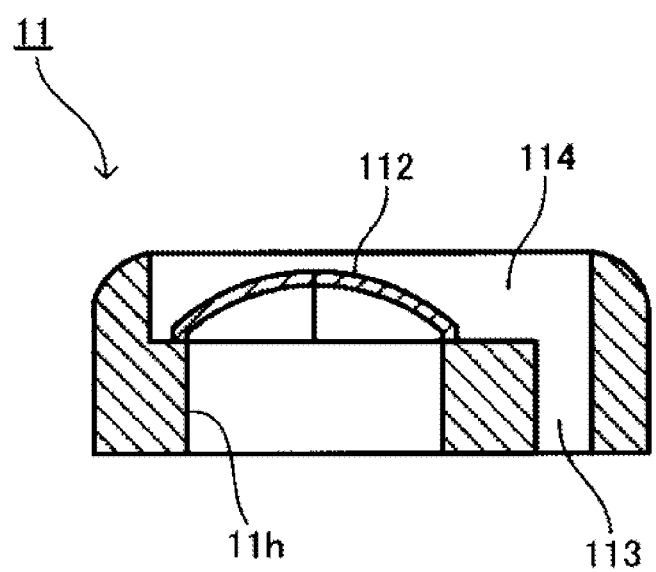
FIG. 8 is a sectional view of the substrate taken along line B-B in FIG. 3.
Figure 9:
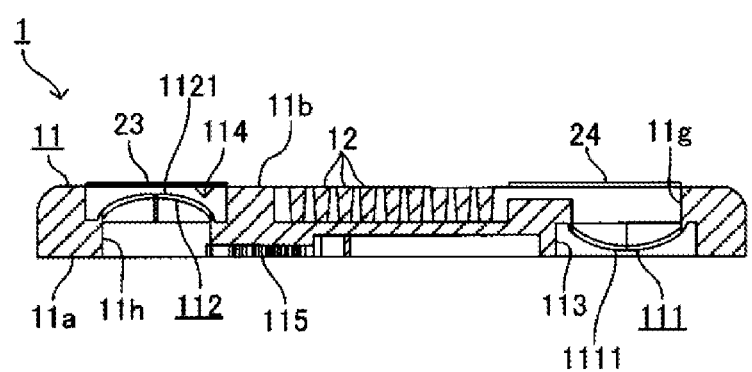
FIG. 9 is a sectional view of the substrate taken along line C-C in FIG. 3.
Figure 10:
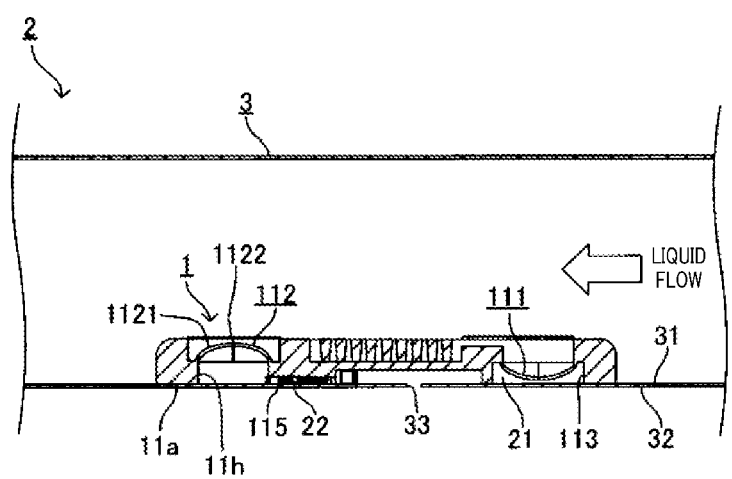
FIG. 10 is a sectional view schematically illustrating a drip irrigation apparatus according to an embodiment of the present invention.

FIG. 1 is a transparent perspective birds-eye view illustrating dripper 1 of the present embodiment. FIG. 2 is a perspective bird's-eye view of substrate 11 in dripper 1. FIG. 3 is a plan view of substrate 11 in dripper 1. FIG. 4 is a bottom view of substrate 11 in dripper 1. FIG. 5 is a front view of substrate 11 in dripper 1. FIG. 6 is a right side view of substrate 11 in dripper 1. FIG. 7 is a sectional view of substrate 11 in dripper 1, taken along line A-A in FIG. 3. FIG. 8 is a sectional view of substrate 11 in dripper 1, taken along line B-B in FIG. 3. FIG. 9 is a sectional view of dripper 1 taken along line C-C in FIG. 3. FIG. 10 is a schematic sectional view illustrating drip watering tube 2 as the drip irrigation apparatus in the present embodiment.

As illustrated in FIG. 10, drip watering tube 2 includes elongated tube main body 3 serving as a flow pipe through which an irrigation liquid flows, and dripper 1 disposed in tube main body 3.

In addition, as illustrated in FIG. 10, dripper 1 is disposed on inner peripheral surface 31 of tube main body 3 at a position corresponding to ejection port 33 for ejecting the irrigation liquid, in such a manner as to cover ejection port 33. Ejection port 33 opens through inner peripheral surface 31 and outer peripheral surface 32, and extends through the pipe wall of tube main body 3. Dripper 1 is configured to control the ejection amount per unit time of the irrigation liquid from the corresponding ejection port 33.

It is noted that, while FIG. 10 illustrates one dripper 1 and one ejection port 33 for convenience, a plurality of drippers 1 and a plurality of ejection ports 33 are actually disposed along the longitudinal direction of tube main body 3 at a predetermined interval between the adjacent ports.

In addition, in FIG. 10, the right and left sides of the channel in tube main body 3 correspond to the upstream side and the downstream side, respectively.

Further, in the present embodiment, dripper 1 is integrally formed by resin molding using a metal mold. Examples of the resin material used for the resin molding include inexpensive materials such as polypropylene. The molding method may be injection molding.

<Outline of Substrate>

As illustrated in FIGS. 1 to 10, dripper (dripper main body) 1 has substrate 11 made of a resin material. A channel part for providing a channel for dripper 1 is formed in substrate 11. The rough external shape of substrate 11 is composed of the respective planar surfaces of bottom end surface 11$a$, top surface 11$b$ at the side opposite to bottom end surface 11$a$, left side surface 11$c$, right side surface 11$d$, front side surface 11$e$, and rear side surface 11$f$. The vertical and lateral positional relationship among the surfaces is as indicated by cross arrow in FIG. 3. As illustrated in FIGS. 1 to 10, top surface 11$b$ and bottom end surface 11$a$ are in parallel to each other, left side surface 11$c$ and right side surface 11$d$ are in parallel to each other, and front side surface 11$e$ and rear side surface 11$f$ are in parallel to each other. In addition, top surface 11$b$ and bottom end surface 11$a$ are perpendicular to left side surface 11$c$, right side surface 11$d$, front side surface 11$e$, and rear side surface 11$f$. Further, top surface 11$b$ and bottom end surface 11$a$ are elongated in the left-right direction.

Substrate 11 is joined to inner peripheral surface 31 of tube main body 3 through bottom end surface 11$a$. When tube main body 3 is formed by extrusion molding using a resin material (such as polyethylene) having a melting point equal to or lower than that of the material for dripper 1 (resin material), the above-mentioned joining may be performed by curing tube main body 3, with ready-made dripper 1 being disposed on inner peripheral surface 31 of tube main body 3 to be cured.

<Specific Configuration of Inflow Control Part>

As illustrated in FIGS. 3, 7 and 9, dripper 1 has, at the right end portion of top surface 11$b$, inflow control part 111, which is a part of the channel part of substrate 11, as an inflow part that introduces the irrigation liquid in tube main body 3 into (into the channel of) dripper 1. Inflow control part 111 is configured to control the inflow of the irrigation liquid, at the lower limit value of the liquid pressure of the irrigation liquid to be introduced, i.e., the liquid pressure outside of the channel of dripper 1, or the pressure of the liquid in tube main body 3 (hereinafter, also referred to as "external liquid pressure").

Figure 11A:
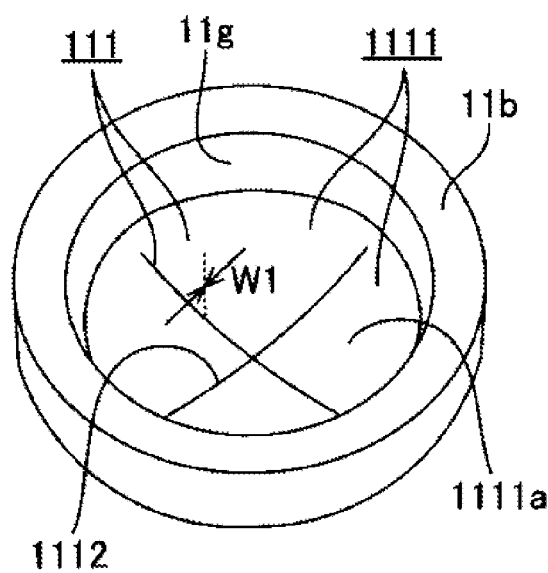
FIG. 11A is an enlarged perspective birds-eye view illustrating an inflow control part in the present embodiment.

Specifically, as illustrated in FIG. 11A, inflow control part 111 has plate-like body 1111 to receive the external liquid pressure, and first slit 1112 formed in plate-like body 1111, for introducing the irrigation liquid in tube main body 3.

As illustrated in FIG. 11A, plate-like body 1111 is formed into the shape of a thin dome. Plate-like body 1111 is disposed in a cavity formed of cylindrical first elevation surface 11$g$ that generates an elevation difference from top surface 11$b$, in such a manner that the center portion of plate-like body 1111 is protruded the most toward inner peripheral surface 31 side of tube main body 3 (downwardly). As illustrated in FIG. 11A, first slit 1112 is formed radially (in FIG. 11A, in a cross-shaped manner) and concentrically with plate-like body 1111. Plate-like body 1111 is equally divided into a plurality of (in FIG. 11A, four) segments 1111$a$ by first slit 1112.

As illustrated in FIG. 11A, first slit 1112 is formed such that the opening width W1 is zero when plate-like body 1111 is not exposed to the irrigation liquid having an external liquid pressure equal to or more than the lower limit value in tube main body 3. The lower limit value is a set lower limit value of the above external liquid pressure. The opening width W1 is a width in a direction orthogonal to the longitudinal direction of the opening given by first slit 1112. Inflow control part 111 may be configured by forming first slit 1112 as a cut line not having a substantial gap in plate-like body 1111.

Further, as illustrated in FIG. 11A, plate-like body 1111 is configured such that the opening width W1 of first slit 1112 is maintained at zero when the external liquid pressure is less than the set lower limit value. In inflow control part 111 in such closed state, the rigidity of plate-like body 1111 surpasses the external liquid pressure, and thus elastic deformation of plate-like body 1111 toward inner peripheral surface 31 side of tube main body 3 does not occur, to thereby maintain the closed inflow control part 111. In this case, the inflow of the irrigation liquid through first slit 1112 is inhibited. It is noted that the lower limit value may be 0.005 MPa, for example.

Figure 11B:
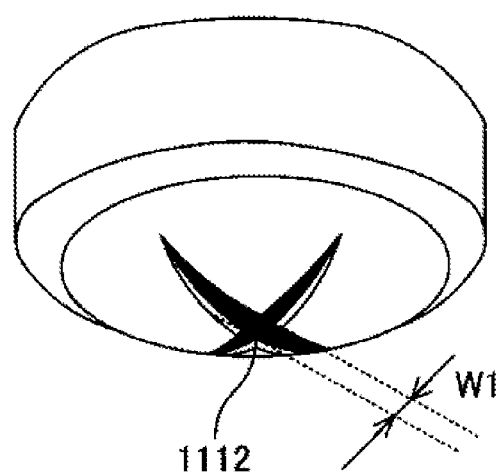
FIG. 11B is an enlarged perspective upward view illustrating the inflow control part.

When the external liquid pressure is equal to or more than the above-mentioned lower limit value, plate-like body 1111 undergoes elastic deformation toward inner peripheral surface 31 side of tube main body 3 after yielding to the external liquid pressure. As illustrated in FIG. 11B, that elastic deformation allows plate-like body 1111 to be expanded such that the opening width W1 of first slit 1112 is more than zero. Thus, inflow control part 111 allows the inflow of the irrigation liquid through first slit 1112.

Figure 12A:
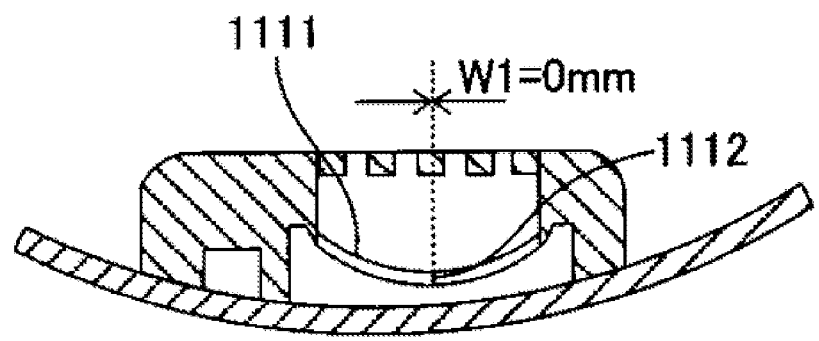
FIG. 12A is a sectional view schematically illustrating the state in which the inflow control part is closed.
Figure 12B:
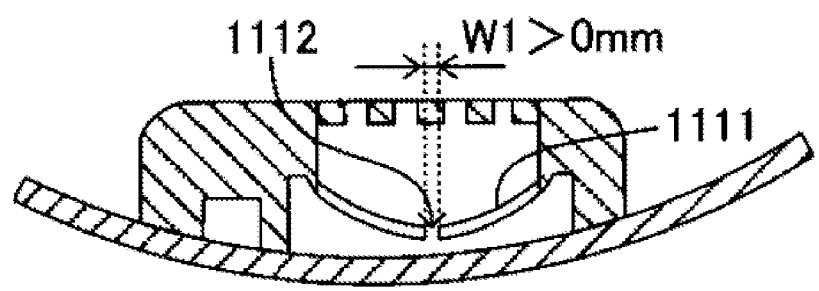
FIG. 12B is a sectional view schematically illustrating the state in which the inflow control part is opened.

FIGS. 12A and 12B illustrate the simulation results of the movement of inflow control part 111 made of polypropylene having a thickness of 0.2 mm, as a specific example of such movement of inflow control part 111.

When the external liquid pressure is less than 0.005 MPa as the lower limit value, as illustrated in FIG. 12A, the opening width W1 of first slit 1112 is maintained at zero, so that the inflow of the irrigation liquid into dripper 1 is inhibited. When the external liquid pressure is equal to or more than 0.005 MPa, as illustrated in FIG. 12B, the opening width W1 is more than zero, so that the inflow of the irrigation liquid into dripper 1 is allowed.

<Specific Configuration of Inflow Control Part>

As illustrated in FIGS. 4, 9 and 10, dripper 1 has flow rate control part 112 as a part of the channel part of substrate 11. Flow rate control part 112 is disposed at left end portion of bottom end surface 11$a$, being a position on the downstream side of inflow control part 111 (in other words, a position offset in a direction orthogonal to the thickness direction of substrate 11 with respect to inflow control part 111). Flow rate control part 112 is formed so as to face inner peripheral surface 31 of tube main body 3. That is, flow rate control part 112 is disposed at a position, in substrate 11, opposed to inner peripheral surface 31 of tube main body 3. Flow rate control part 112 is configured to control the flow rate of the irrigation liquid (hereinafter, also referred to as "inflow liquid") that flows into the channel in dripper 1 from inflow control part 111 and flows toward ejection port 33.

Figure 13A:
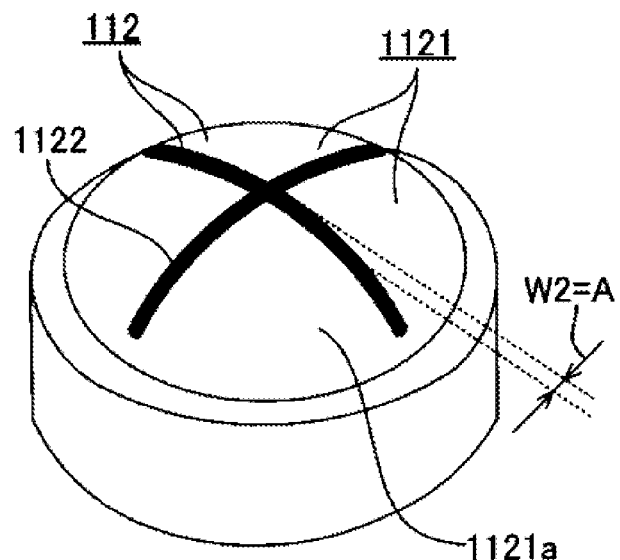
FIG. 13A is an enlarged perspective birds-eye view illustrating a flow rate control part in the present embodiment.

Specifically, as illustrated in FIG. 13A, flow rate control part 112 has plate-shaped valve element 1121 to receive the pressure of the inflow liquid (hereinafter, also referred to as "internal liquid pressure"), and second slit 1122 formed in valve element 1121, for allowing the inflow liquid to flow toward ejection port 33 side.

As illustrated in FIG. 13A, valve element 1121 is formed into the shape of a thin dome. Valve element 1121 is disposed in a cavity formed of cylindrical second elevation surface 11h (see FIG. 9) that generates an elevation difference from bottom end surface 11a, in such a manner that the center portion of valve element 1121 is protruded the most toward the side of tube main body 3 opposite to inner peripheral surface 31 (i.e., upwardly protruded). As illustrated in FIG. 13A, second slit 1122 is formed radially (in FIG. 13A, in a cross-shaped manner) around the center portion of valve element 1121. Valve element 1121 is equally divided into a plurality of (in FIG. 13A, four) valve segments 1121a by second slit 1122.

As illustrated in FIG. 13A, second slit 1122 is formed such that the opening width W2 is a predetermined opening width A more than zero when valve element 1121 does not receive an internal liquid pressure more than a set value. The opening width W2 is a width in a direction orthogonal to the longitudinal direction of the opening given by second slit 1122.

Figure 13B:
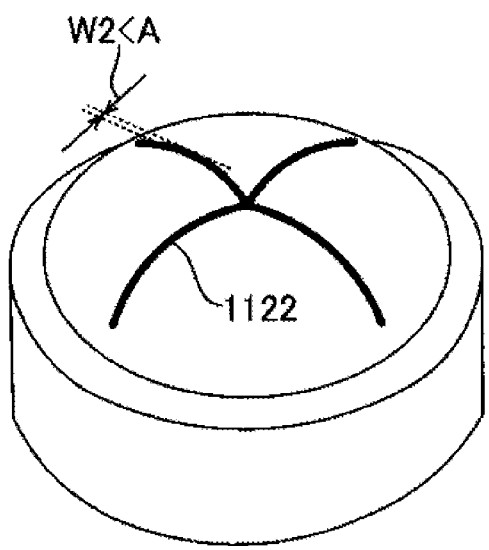
FIG. 13B is an enlarged perspective upward view illustrating the flow rate control part.

When valve element 1121 receives an internal liquid pressure more than the set value of the inflow liquid having reached from the side of tube main body 3 opposite to inner peripheral surface 31, valve element 1121 is deformed toward inner peripheral surface 31 side of tube main body 3 depending on the scale of the internal liquid pressure. As illustrated in FIG. 13B, valve element 1121 allows the opening width W2 of second slit 1122 to be decreased such that the amount of decrease relative to the predetermined opening width A becomes larger as the internal liquid pressure is increased. There may be a lower limit value of the internal liquid pressure at which the deformation of valve element 1121 is started.

Figure 14A:
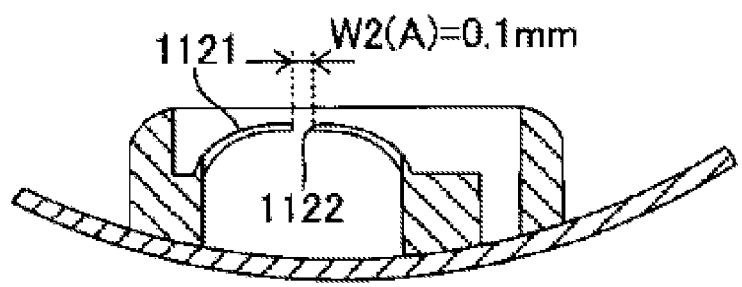
FIG. 14A is a sectional view schematically illustrating the flow rate control part in a full-open state.
Figure 14B:
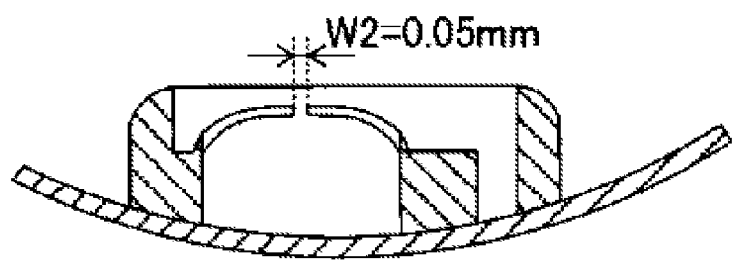
FIG. 14B is a sectional view schematically illustrating the flow rate control part in a semi-open state.
Figure 14C:
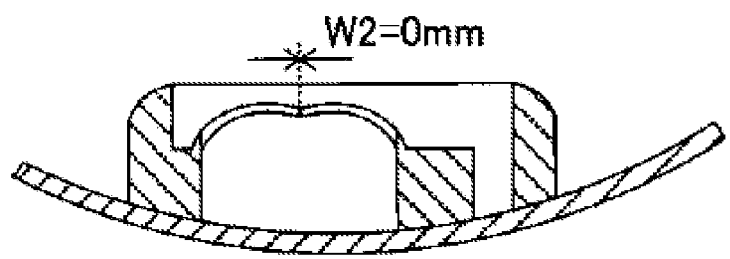
FIG. 14C is a sectional view schematically illustrating the flow rate control part in a full-close state.

FIGS. 14A to 14C illustrate the simulation results of the movement of flow rate control part 112 made of polypropylene. The thickness of valve element 1121 is 0.2 mm, and the opening width W2(A) of second slit 1122 when flow rate control part 112 does not receive the internal liquid pressure is 0.1 mm As illustrated in FIG. 14A, for example when the internal liquid pressure is increased to 0.01 MPa, the deformation of valve element 1121 and the decrease in the opening width W2 of second slit 1122 associated with that deformation are started. As illustrated in FIG. 14B, for example when the internal liquid pressure is 0.05 MPa, the opening width W2 of second slit 1122 is 0.05 mm, a half width of the original width A. As illustrated in FIG. 14C, for example when the internal liquid pressure is 0.10 MPa, the opening width W2 of second slit 1122 is 0 mm Thus, dripper 1 may be used under pressure lower than 0.10 MPa, for example.

<Specific Configuration of Guide Channel Part>

As illustrated in FIGS. 4 to 9, dripper 1 has, in bottom end surface 11a, guide channel part 113 as a part of the channel part of substrate 11.

Guide channel part 113 is composed of a recess concaved from bottom end surface 11a. Guide channel part 113 is formed in a predetermined area leftward from under inflow control part 111 such that the bottom surface of plate-like body 1111 is exposed downwardly.

As illustrated in FIG. 10, guide channel part 113 composes guide channel 21 for guiding the inflow liquid toward flow rate control part 112 side together with inner peripheral surface 31 of tube main body 3, which seals the bottom end opening of the above recess.

<Specific Configuration of Hollow Part>

As illustrated in FIGS. 3, 4, 8 and 9, dripper 1 has hollow part 114 as a part of the channel part of substrate 11, at a position on the downstream side of guide channel part 113 and on the upstream side of flow rate control part 112. Hollow part 114 is a cavity concaved from top surface 11b. Hollow part 114 is formed such that the top surface of valve element 1121 is exposed upwardly and so as to be connected continuously to the terminal of guide channel part 113 (left end in FIG. 4).

As illustrated in FIG. 9, the upper opening of hollow part 114 is shielded from the outside of dripper 1 by plate-shaped first shielding wall part 23. First shielding wall part 23 may be formed by bending a plate-shaped part having been molded integrally with substrate 11 using the same resin material as that of substrate 11 and being bendable so as to cover the opening of hollow part 114 afterward and then by heat-welding the plate-shaped part on the periphery of that opening (allowing the opening to be shielded). Alternatively, first shielding wall part 23 may be formed using another member (e.g., film sheet) having been manufactured in processes separated from those for substrate 11 and being joined so as to shield the upper opening of hollow part 114.

Hollow part 114 allows communication between guide channel part 113 and the channel in second slit 1122.

<Specific Configuration of Pressure Reduction Channel Part>

As illustrated in FIGS. 4 and 9, dripper 1 has, on bottom end surface 11a, pressure reduction channel part 115 as a part of the channel part of substrate 11.

As illustrated in FIG. 4, pressure reduction channel part 115 is a groove formed in bottom end surface 11a. Pressure reduction channel part 115 is formed in an area from flow rate control part 112 side (left side) to ejection port 33 side (right side). The planar shape of pressure reduction channel part 115 is a serpentine shape (in other words, stream line shape or zig-zag shape) in the front-rear direction in FIG. 4. Pressure reduction channel part 115 is formed at a position on the front side relative to guide channel part 113 so as not to interfere with guide channel part 113.

As illustrated in FIG. 10, pressure reduction channel part 115 composes pressure reduction channel 22 together with inner peripheral surface 31, which shields the bottom end opening of the groove, of tube main body 3. Pressure reduction channel 22 allows the inflow liquid having passed through flow rate control part 112 to flow toward ejection port 33 while reducing the pressure of the inflow liquid.

Pressure reduction channel 22 is allowed to communicate with the channel in second slit 1122 through a space surrounded by valve element 1121, elevation surface 11h and inner peripheral surface 31 of tube main body 3.

<Other Components>

As illustrated in FIGS. 1 and 3, in a predetermined area in the longitudinal direction on top surface 11b, there is formed a recess having substantially the same width as the width of top surface 11a. On the bottom of the recess, a plurality of plate-shaped convex parts 12 protruded upwardly and elongated in the front-rear direction are aligned at a predetermined interval between the adjacent parts in the longitudinal (left-right) direction of top surface 11b. The length (length in the front-rear direction) of convex part 12 is shorter than the width of the recess, and there is a gap between each end of convex part 112 and the wall surface of the recess. A plurality of convex parts 12 function as a filter to prevent the inflow of relatively large foreign matter into the channel of dripper 1.

As illustrated in FIGS. 1 to 3, between convex part 12 in top surface 11b and inflow control part 111, a plurality of groove parts 13 are aligned at a predetermined interval between the adjacent parts in the short-length (front-rear) direction of top surface 11b. Groove part 13 is a strip of recess elongated in the left-right direction and recessed vertically downwardly. The right end surface of each of linear protrusions between a plurality of grooves 13 composes a part of first elevation surface 11g, and the right end of each of a plurality of groove parts 13 is connected continuously to first elevation surface 11g.

Further, as illustrated in FIGS. 1 and 9, second shielding wall part 24 is formed at a position corresponding to groove part 13 on top surface 11b and inflow control part 111. Second shielding wall part 24 shields both the upper opening of groove part 13 and the upper opening of first elevation surface 11g. Between groove part 13 and second shielding wall part 24, there is formed a channel for the irrigation liquid flowing toward inflow control part 111 from the recess. Second shielding wall part 24 may be formed in a method similar to that for first shielding wall part 23.

<Principal Operation and Effect of Present Embodiment>

According to the present embodiment, the irrigation liquid in tube main body 3 is deprived of relatively large foreign matter by convex part 12, and then reaches inflow control part 111 through between groove part 13 and second shielding wall part 24.

When the external liquid pressure of the irrigation liquid having reached inflow control part 111 does not amount to the set lower limit value, the rigidity of plate-like body 1111 in inflow control part 111 surpasses the external liquid pressure. Accordingly, elastic deformation of plate-like body 1111 does not occur. Thus, the opening width W1 in first slit 1112 is maintained at zero (i.e., equivalent to the state where the external liquid pressure has no influence), thereby inhibiting the inflow of the irrigation liquid.

When the external liquid pressure of the irrigation liquid having reached inflow control part 111 amounts to the set lower limit value, the external liquid pressure surpasses the rigidity of plate-like body 1111. Accordingly, plate-like body 1111 (each segment 1111a) undergoes elastic deformation toward inner peripheral surface 31 side of tube main body 3. Thus, first slit 1112 is expanded such that the opening width W1 is increased from zero to a value depending on the external liquid pressure, thereby allowing the inflow of the irrigation liquid.

The inflow liquid having been flowed out of inflow control part 111 reaches flow rate control part 112 after going through guide channel 21 and hollow part 114 sequentially.

Valve element 1121 of flow rate control part 112 undergoes elastic deformation toward inner peripheral surface 31 side of tube main body 3 depending on the internal liquid pressure of the inflow liquid having reached flow rate control part 112. Due to the elastic deformation, the opening width W2 of second slit 1122 is decreased relative to the opening width W2 (=A) where the internal liquid pressure has no influence, such that the amount of decrease in the flow rate of the liquid passing through flow rate control part 112 becomes larger as the internal liquid pressure is increased. For example, when the internal liquid pressure of the inflow liquid is less than a first set value of the internal liquid pressure, the opening width W2 is an initial value A; when the internal liquid pressure of the inflow liquid is equal to or more than that first set value, the opening width W2 becomes smaller than the initial value A; and when the internal liquid pressure of the inflow liquid is further raised to be equal to or more than a second set value, the opening width W2 is zero. It is noted that a suitable lower limit value may be set depending on the thickness of valve element 1121, the width of slit 1122, or the like, as a lower limit value of the internal liquid pressure at which valve element 1121 undergoes elastic deformation.

Due to the decrease in the opening width W2 associated with the elastic deformation of valve element 1121, the flow rate of the inflow liquid passing through the channel in second slit 1122 (flow rate of that inflow liquid flowing toward ejection port 33 side all at once) is regulated.

The inflow liquid, of which flow rate is regulated by flow rate control part 112, undergoes pressure reduction due to a pressure loss caused by the shape of the channel of pressure reduction channel 22, and then is ejected outside of drip watering tube 2 from ejection port 33.

It is noted that the liquid flowed out of pressure reduction channel 22 is guided by a baffle part of which planar shape is a circular arc (see FIG. 4) so as to be diffused in a chamber in which ejection port 33 is formed. Further, since the above baffle part is disposed between the outlet of pressure reduction channel 22 and ejection port 33, foreign matter having intruded into the above chamber from ejection port 33 are prevented from further intruding into pressure reduction channel 22.

Here, two drippers 1 disposed relatively on the upstream side and the downstream side will be discussed.

In dripper 1 relatively on the upstream side, relatively high external liquid pressure causes the amount of the inflow liquid to be relatively large. At the same time, relatively higher internal liquid pressure also causes the flow rate limited by flow rate control part 112 to be relatively larger. Therefore, the amount of the inflow liquid to be ejected from ejection port 33 is not excessively large.

In dripper 1 relatively on the downstream side, relatively low external liquid pressure causes the amount of the inflow liquid to be relatively small. At the same time, relatively lower internal liquid pressure also causes the flow rate limited by flow rate control part 112 to be relatively smaller. Therefore, the amount of the inflow liquid to be ejected from ejection port 33 is not excessively small.

Accordingly, there is less variation in the amount of the inflow liquid to be ejected from ejection port 33 between ejection ports 33 on the upstream side and the downstream side (e.g., the variation may be limited to 5 to 10%). Thus, the amount of the inflow liquid to be ejected through individual ejection ports in drip watering tube 2 can be favorably controlled. The above-described effects can be surely achieved also in the case of performing long-distance watering using irrigation liquid with low liquid pressure, since dripper 1 is devised such that the pressure loss in tube main body 3 is alleviated, as described later.

According to the present embodiment, the channel part, for composing the channel of dripper 1, including inflow control part 111 is integrally formed into substrate 11 made of a resin material, and thus dripper 1 can be precisely manufactured at lower cost and at fewer processes and in a smaller size (in particular, reduced thickness).

Alternatively, according to the present embodiment, the channel part for composing the channel including flow rate control part 112 is integrally formed into substrate 11 made of a resin material, thereby enabling such dripper 1 excellent in controlling the ejection amount of the irrigation liquid to be precisely manufactured at lower cost and at fewer processes and in a smaller size (in particular, reduced thickness).

The smaller size (reduced thickness) of dripper 1 enables the area occupancy of dripper 1 with respect to a section of the channel in tube main body 3 to be reduced, and thus the pressure loss of the irrigation liquid in tube main body 3 can be limited. As a result, even when the liquid pressure (in other words, external liquid pressure) of the irrigation liquid to be supplied to drip watering tube 2 from the water source side is low, sufficient liquid pressure can be secured in an area up to the downstream side of tube main body 3. Therefore, long-distance watering can be properly performed at a stable ejection amount.

In addition, since inflow control part 111 is an integrally molded product with substrate 11, a malfunction of inflow control part 111 caused by assembly error does not occur. Therefore, the inflow control and thus the ejection control of the irrigation liquid can be stabilized.

In addition, since flow rate control part 112 is an integrally molded product with substrate 11, a malfunction of flow rate control part 112 caused by assembly error does not occur. Therefore, the ejection amount of the inflow liquid can be further stabilized.

Further, dripper 1 does not require an expensive material such as silicone rubber, and can be manufactured basically with a single inexpensive resin material. Therefore, the production cost can be reduced. In addition, the number of components and the number of manufacturing processes can also be surely reduced, compared to the dripper into which three components are assembled as disclosed in PTL 1. Thus, according to the present embodiment, cost reduction can be achieved.

Furthermore, flow rate control part 112 is disposed at a position offset in a direction orthogonal to the thickness direction of substrate 11 with respect to inflow control part 111. Therefore, it is further advantageous to make dripper 1 thinner.

In addition, when each segment 1111a receives the external liquid pressure from above, plate-like body 1111 of inflow control part 111 deflects downwardly and outwardly utilizing the elasticity of a resin material, in such a manner that the tips of the respective segments 1111a are spaced apart from each other. Thus, segment 1111a is formed into a suitable shape to expand first slit 1112 upon receiving the external liquid pressure efficiently, and thus the inflow control can be performed more properly.

In addition, when each valve segment 1121a receives the internal liquid pressure from above, valve element 1121 of flow rate control part 112 deflects downwardly and inwardly utilizing the elasticity of a resin material. As a result, the height of the upward protrusion of valve segment 1121a is decreased, and at the same time the tips of the respective valve elements 1121a come closer to each other. Thus, valve element 1121 is formed into a suitable shape to decrease the opening width W2 of second slit 1122 upon receiving the internal liquid pressure efficiently, and thus the control of the flow rate toward ejection port 33 can be performed more properly.

It is noted that the present invention is not limited to the above-described embodiments, and may be variously modified as long as the features of the present invention are not impaired.

For example, plate-like body 1111 may have a shape other than the domed shape (e.g., pyramidal shape or flat shape) as necessary.

For example, valve element 1121 may have a shape other than the domed shape (e.g., pyramidal shape) as necessary.

For example, both plate-like body 1111 and valve element 1121 may be disposed so as to be protruded toward the center of tube main body 3, or alternatively may be disposed so as to be protruded toward inner peripheral surface 31 of tube main body 3. Further, plate-like body 1111 may be disposed so as to be protruded toward the center of tube main body 3, with valve element 1121 being disposed so as to be protruded toward inner peripheral surface 31 of tube main body 3.

In addition, the inflow part does not need to be the inflow control part. For example, the inflow part may be mere a channel for liquid, such as a pore or a slit. In this case, the dripper has the flow rate control part, and achieves the effects obtained by the flow rate control part, among the above-described effects.

In addition, the dripper does not need to have the flow rate control part when the dripper has the inflow control part. In this case, the dripper achieves the effects obtained by the inflow control part, among the above-described effects.

All the contents disclosed in the specification, drawings and abstract of Japanese Patent Application No. 2012-216575 filed on Sep. 28, 2012 and Japanese Patent Application No. 2012-216576 filed on Sep. 28, 2012 are incorporated herein by reference.

INDUSTRIAL APPLICABILITY

The dripper according to the present invention is capable of supplying a stable amount of liquid without depending on the pressure of liquid inside a tube. Therefore, it is expected that the dripper and drip irrigation apparatus according to the present invention are utilized not only in drip irrigation but also in various industries where stable dropwise addition of liquid is demanded.

REFERENCE SIGNS LIST

1 Dripper
11 Substrate
111 Inflow control part
112 Flow rate control part
1111 Plate-like body
1112 First slit
1121 Valve element
1122 Second slit
2 Drip watering tube
3 Tube main body
31 Inner peripheral surface
32 Outer peripheral surface
33 Ejection port

The invention claimed is:

1. A dripper for drip irrigation for controlling an amount of irrigation liquid ejected from an ejection port extending through a pipe wall of a flow pipe through which the irrigation liquid flows, the dripper for drip irrigation configured to be disposed at a position corresponding to the ejection port on an inner peripheral surface of the flow pipe, the dripper for drip irrigation comprising:

a substrate including a resin material, to be joined to the inner peripheral surface of the flow pipe, and including a channel part for composing a channel in the dripper for drip irrigation, wherein the channel part includes an inflow part that introduces the irrigation liquid in the flow pipe into the dripper for drip irrigation, and satisfies one or both of the following items (A) and (B):

(A) the inflow part being an inflow control part that controls the inflow of the irrigation liquid based on a set value of a liquid pressure of the irrigation liquid in the flow pipe, the inflow control part including:

a plate-like body to be exposed to the irrigation liquid in the flow pipe, and a first slit formed in the plate-like body, for introducing the irrigation liquid in the flow pipe thereinto, the first slit being formed to have an opening width of zero when the plate-like body is not exposed to the irrigation liquid having a liquid pressure equal to or more than the set value, and the plate-like body maintaining the opening width of the first slit at zero without deforming the first slit toward an inner peripheral surface side of the flow pipe to inhibit the inflow of the irrigation liquid through the first slit when the liquid pressure is less than the set value, and expanding the first slit such that the opening width of the first slit is more than zero by deforming the first slit toward the inner peripheral surface side of the flow pipe to allow the inflow of the irrigation liquid through the first slit when the liquid pressure is equal to or more than the set value, and (B) the channel part further including a flow rate control part formed at a position on a downstream side of the inflow part so as to face the inner peripheral surface of the flow pipe for controlling a flow rate of the irrigation liquid flowing from the inflow part to the ejection port, the flow rate control part including:

a plate-shaped valve element to be exposed to the introduced irrigation liquid, and a second slit being formed in the valve element, for allowing the introduced irrigation liquid to flow toward an ejection port side, the second slit being formed to have a predetermined opening width when the valve element does not receive an internal liquid pressure equal to or more than a predetermined value, the internal liquid pressure being pressure of the liquid that flows into the channel, and the valve element being deformed toward the inner peripheral surface side from a side of the flow pipe opposite to the inner peripheral surface depending on the internal liquid pressure to decrease the opening width of the second slit with respect to the predetermined opening width as the internal liquid pressure is increased.

2. The dripper for drip irrigation according to claim 1, wherein the first slit is formed radially to divide the plate-like body into a plurality of segments.

3. The dripper for drip irrigation according to claim 2, wherein the plate-like body is formed to be protruded toward the inner peripheral surface side of the flow pipe.

4. The dripper for drip irrigation according to claim 3, wherein the plate-like body is formed such that a center portion of the plate-like body is protruded the most, and the first slit is formed radially around the center portion.

5. The dripper for drip irrigation according to claim 4, wherein the plate-like body is formed in a domed shape.

6. The dripper for drip irrigation according to claim 1, wherein the valve element is formed to be protruded toward a side of the flow pipe opposite to the inner peripheral surface, and wherein the second slit is formed radially to divide the valve element into a plurality of valve segments.

7. The dripper for drip irrigation according to claim 6, wherein the valve element is formed such that a center portion of the valve element is protruded the most, and wherein the second slit is formed radially around the center portion.

8. The dripper for drip irrigation according to claim 7, wherein the valve element is formed in a domed shape.

9. The dripper for drip irrigation according to claim 1, wherein the flow rate control part is disposed at a position offset in a direction orthogonal to a thickness direction of the substrate with respect to the inflow control part.

10. The dripper for drip irrigation according to claim 1, wherein the channel part further includes:

a guide channel part for composing, together with the inner peripheral surface of the flow pipe, a guide channel for guiding the introduced irrigation liquid toward a flow rate control part side; and a hollow part that is formed at a position on a downstream side of the guide channel part and on an upstream side of the flow rate control part and allows communication between the guide channel part and the second slit.

11. The dripper for drip irrigation according to claim 1, wherein the channel part further includes a pressure reduction channel part for composing, together with the inner peripheral surface of the flow pipe, a pressure reduction channel that allows the irrigation liquid having passed through the flow rate control part or the inflow control part to flow toward the ejection port while reducing the pressure of the irrigation liquid.

12. A drip irrigation apparatus comprising:

a flow pipe through which irrigation liquid flows; and the dripper for drip irrigation according to claim 1 for controlling an amount of the irrigation liquid ejected from an ejection port extending through a pipe wall of the flow pipe, the dripper for drip irrigation being disposed at a position corresponding to the ejection port on an inner peripheral surface of the flow pipe.

* * * * *